(12) United States Patent
Sakaki et al.

(10) Patent No.: US 9,015,663 B2
(45) Date of Patent: Apr. 21, 2015

(54) INFORMATION PROCESSING DEVICE, INFORMATION PROCESSING METHOD, AND INFORMATION PROCESSING PROGRAM

(75) Inventors: Hiroshi Sakaki, Tokyo (JP); Takao Osaki, Tokyo (JP)

(73) Assignee: NEC Corporation, Tokyo (JP)

( * ) Notice: Subject to any disclaimer, the term of this patent is extended or adjusted under 35 U.S.C. 154(b) by 46 days.

(21) Appl. No.: 13/635,013

(22) PCT Filed: Mar. 7, 2011

(86) PCT No.: PCT/JP2011/055851
§ 371 (c)(1),
(2), (4) Date: Sep. 14, 2012

(87) PCT Pub. No.: WO2011/115024
PCT Pub. Date: Sep. 22, 2011

(65) Prior Publication Data
US 2013/0007708 A1 Jan. 3, 2013

(30) Foreign Application Priority Data
Mar. 15, 2010 (JP) .................. 2010-058525

(51) Int. Cl.
G06F 9/44 (2006.01)

(52) U.S. Cl.
CPC ..................... *G06F 8/10* (2013.01)

(58) Field of Classification Search
USPC ..................................... 717/120
See application file for complete search history.

(56) References Cited

U.S. PATENT DOCUMENTS

| | | |
|---|---|---|
| 6,990,628 B1 * | 1/2006 | Palmer et al. ........... 715/234 |
| 7,562,066 B2 * | 7/2009 | Kawatani ............ 707/999.002 |

(Continued)

FOREIGN PATENT DOCUMENTS

| | | |
|---|---|---|
| JP | H07-56726 A | 3/1995 |
| JP | 2000-148793 A | 5/2000 |

(Continued)

OTHER PUBLICATIONS

Yamamoto et al. "Similarity of Software System and Its Measurement Tool SMMT", 2007, Wiley Periodicals, Inc. vol. 38.*
Dongen et al., "Measuring Similarity between Business Process Models", 2008, pp. 450-464, Springer-Verlag Berlin Heidelberg.*
Bilenko et al., "Adaptive Duplicate Detection Using Learnable String Similarity Measures", Aug. 24-27, 2003, ACM.*
Ganesan et al., "Exploiting Hierarchical Domain Structure to Compute Similarity", vol. 21, No. 1, Jan. 2003, pp. 64-93, ACM.*

(Continued)

*Primary Examiner* — Anna Deng
*Assistant Examiner* — Junchun Wu
(74) *Attorney, Agent, or Firm* — Dickstein Shapiro LLP

(57) ABSTRACT

An objective of the disclosed invention is to derive a more apt similarity by taking into account all components up to and including lower order components that are included in a model. The disclosed invention also allows carrying out more efficient information system building.

An information processing device (1000) includes a model storage unit (10), a component correspondence determination unit (20), and a similarity computation unit (30). The model storage unit (10) there among stores a system model that includes at least one component. The component correspondence determination unit (20) determines a correspondence relationship between components included in two system models (A, B) that are read out from the model storage unit (10), on the basis of commonality of lower order components included in the components. The similarity computation unit (30) calculates the similarity of the two system models on the basis of the correspondence relationship between the components that is determined with the component correspondence determination unit (20).

11 Claims, 22 Drawing Sheets

(56) References Cited

U.S. PATENT DOCUMENTS

| | | | |
|---|---|---|---|
| 7,987,445 B2* | 7/2011 | Fuller et al. | 717/105 |
| 8,166,049 B2* | 4/2012 | Bose Rantham Prabhakara et al. | 707/748 |
| 8,364,716 B2* | 1/2013 | Gaonkar et al. | 707/791 |
| 8,499,284 B2* | 7/2013 | Pich et al. | 717/120 |
| 8,532,396 B2* | 9/2013 | Rezazadeh et al. | 382/199 |
| 2001/0054153 A1* | 12/2001 | Wheeler et al. | 713/185 |
| 2003/0200098 A1* | 10/2003 | Geipel et al. | 705/1 |
| 2009/0282384 A1* | 11/2009 | Keppler | 717/104 |
| 2010/0318985 A1* | 12/2010 | Moffatt et al. | 717/175 |
| 2013/0339932 A1* | 12/2013 | Holler et al. | 717/128 |
| 2014/0013071 A1* | 1/2014 | Nakajima et al. | 711/170 |

FOREIGN PATENT DOCUMENTS

| | | |
|---|---|---|
| JP | 2007-172077 A | 7/2007 |
| JP | 2008-146300 A | 6/2008 |
| WO | WO-2009/069474 A1 | 6/2009 |

OTHER PUBLICATIONS

International Preliminary Report on Patentability issued for PCT/JP2011/055851 dated Feb. 15, 2012 (English translation attached).

Japanese Office Action issued for counterpart application Jp 2012-505651, mail date Aug. 26, 2014 (English translation of Examiners comments attached).

* cited by examiner

Fig.6

| | COMPONENT CORRESPONDENCE COMPUTATION FORMULA | THRESHOLD VALUE |
|---|---|---|
| 131a | $$b(fb, FB) = \sum_{(fs, FS) \in \{\overline{fs} \times \overline{FS}\}} \frac{2 \times s(fs, FS)}{num(\overline{fs}) + num(\overline{FS})}$$ | TH |
| | MODEL SIMILARITY COMPUTATION FORMULA | |
| 131b | $$s = 1 - \sum_{(fb, FB) \in \{\overline{fb} \times \overline{FB} \mid b(fb, FB) \geqq TH\}} \frac{1 - b(fb, FB)}{\max(num(\overline{fb}), num(\overline{FB}))}$$ | |

| MODEL Y \ MODEL X | COMPONENT A | COMPONENT B | ... |
|---|---|---|---|
| COMPONENT A | b (Ax, Ay) | b (Bx, Ay) | ... |
| COMPONENT C | b (Ax, Cy) | b (Bx, Cy) | ... |
| ... | ... | ... | |

122a

NO SMALLER THAN THRESHOLD VALUE TH ⇒

| MODEL Y \ MODEL X | COMPONENT A | COMPONENT B | ... |
|---|---|---|---|
| COMPONENT A | b (Ax, Ay) | — | ... |
| COMPONENT C | — | b (Bx, Cy) | ... |
| ... | ... | ... | |

122b

| | CLIENT | APPLICATION SERVER | DB SERVER |
|---|---|---|---|
| CLIENT | 1 | 0.33 | 0.5 |
| WEB SERVER | 0.5 | 0.66 | 0.5 |
| APPLICATION SERVER | 0.4 | 0.86 | 0.2 |
| DB SERVER | 0.5 | 0.33 | 1 |

2000

| | CLIENT | APPLICATION SERVER | DB SERVER |
|---|---|---|---|
| CLIENT | 1 | – | – |
| WEB SERVER | – | 0.66 | – |
| APPLICATION SERVER | – | 0.86 | – |
| DB SERVER | – | – | 1 |

| | CLIENT | APPLICATION SERVER | | | DB SERVER |
|---|---|---|---|---|---|
| | | | WEB SERVER | APPLICATION SERVER | |
| CLIENT | 1 | – | | | – |
| APPLICATION SERVER | – | 0.95 | | | – |
| WEB SERVER | – | | 0.66 | | – |
| APPLICATION SERVER | – | | | 0.86 | – |
| DB SERVER | – | – | | | 1 |

2201

INFORMATION PROCESSING DEVICE, INFORMATION PROCESSING METHOD, AND INFORMATION PROCESSING PROGRAM

FIELD OF THE INVENTION

The present invention relates to a technology of performing a building support of an information system.

BACKGROUND OF THE INVENTION

A technological example of performing the building support of the information system is disclosed in a patent literature 1 and a patent literature 2. The technology disclosed in the patent literature 1 calculates similarity between UMLs (Unified Modeling Language) which are unified model description language. An information system building auxiliary system described in the patent literature 1 calculates the similarity on the basis of connective relation of attribute of components and other components included in the UML diagram.

On the other hand, in paragraphs [0012] to [0017] of the patent literature 2, it is disclosed in the reuse software production system to compare requirement function items and functions of standard software in a standard software memorizing means, and to calculate adaptability of each standard software from a ratio of matched functions.

THE PRIOR ART DOCUMENT

Patent Literature

The patent literature 1: The Japanese Patent Application Laid-Open No. 2008-146300
The patent literature 2: The Japanese Patent Application Laid-Open No. 1995-56726

SUMMARY OF THE INVENTION

Problems to be Solved by the Invention

However, the technology of the patent literature 1 compares only an attribute (position and name of a figure) of a graphic element of a UML diagram and calculates the similarity. The technology of the patent literature 1 does not calculate the similarity by checking components and sub-components for a model. And, the technology of the patent literature 2 sees only relationship between software and software components, similarly. The technology of the patent literature 2 does not determine the similarity by checking sub-components.

Therefore, the similarity calculated using the technology of the patent literature 1 or the patent literature 2 is not always said to be appropriate, and it sometimes might be a factor of obstructing efficient information system building.

The purpose of the present invention is to provide a technology which can settle the above-mentioned problem.

Means for Solving the Problem

In order to achieve the above-mentioned purpose, a device according to the present invention includes a determination means for determining correspondence relationship between components which are included among two system models on the basis of commonality of sub-components included in said components, and a similarity calculation means for calculating similarity of said two system models on the basis of correspondence relationship between components determined with said determination means.

In order to achieve the above-mentioned purpose, a method according to the present invention determines correspondence relationship between components which are included among two system models on the basis of commonality of sub-components included in said components, and calculates similarity of said two system models on the basis of determined correspondence relationship between said components.

In order to achieve the above-mentioned purpose, an information processing program according to the present invention, which is stored in a program recording medium, makes the computer execute a determination step for determining correspondence relationship between components which are included among two system models on the basis of commonality of sub-components included in said components, and a calculation step for calculating similarity of said two system models on the basis of determined correspondence relationship between said components.

Effect of the Invention

According to the present invention, more appropriate similarity can be acquired on the basis of consideration of up to sub-components of each component included in a model, and, consequently, a more efficient information system building can be executed.

BRIEF DESCRIPTION OF THE DRAWINGS

FIG. 6 A figure showing a component correspondence computation formula and a model similarity computation formula used for the information processing system as the second exemplary embodiment of the present invention.

FIG. 7 A figure showing a correspondence table used for the information processing system as the second exemplary embodiment of the present invention.

FIG. 22 A figure illustrating an example of a correspondence table in order to describe a specific example of the fourth exemplary embodiment of the present invention.

EXEMPLARY EMBODIMENT OF THE INVENTION

Figure 1:
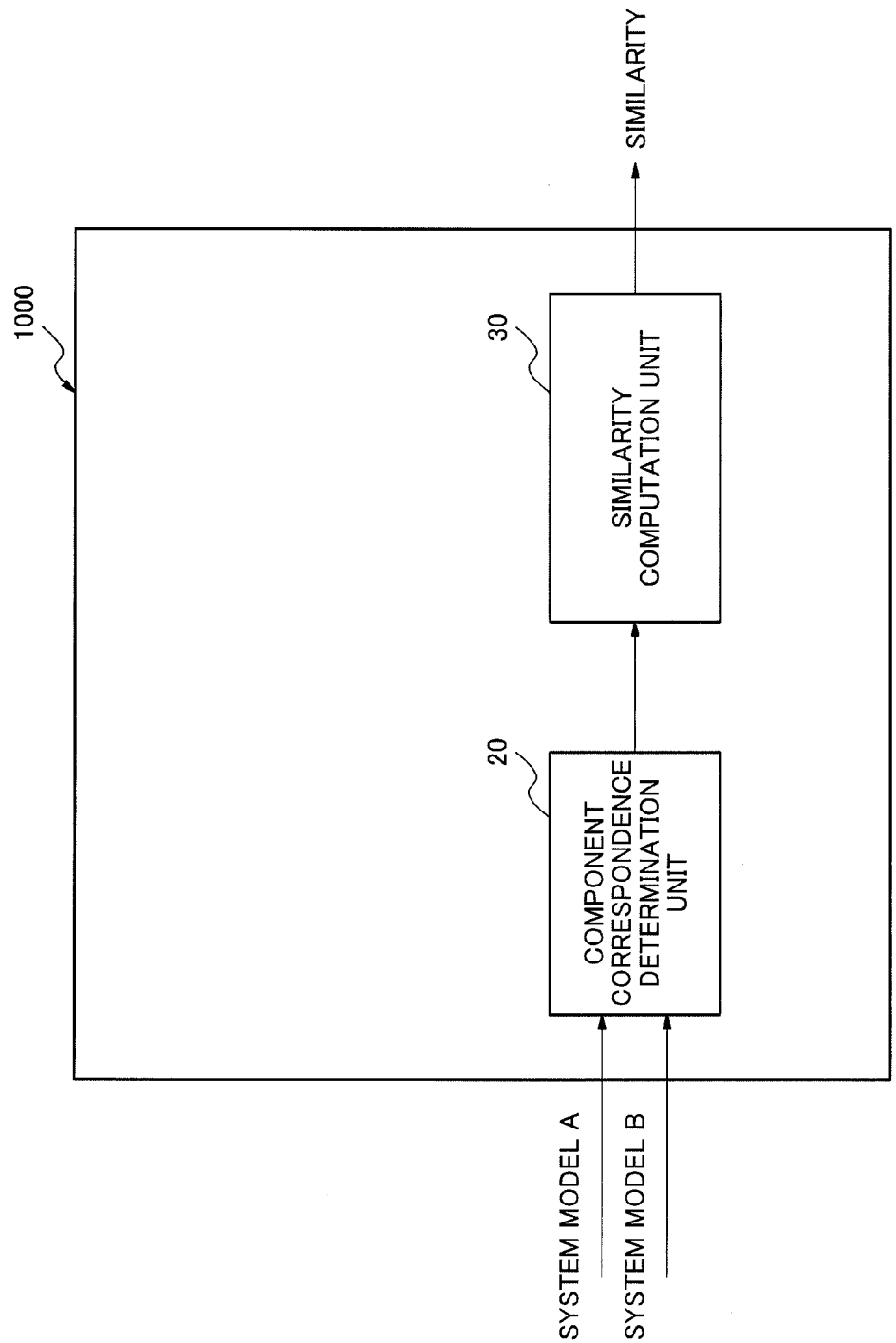
FIG. 1 A figure showing a configuration of an information processing device as the first exemplary embodiment of the present invention.

Hereinafter, an exemplary embodiment of the preset invention will be described with reference to the drawing in detail. However, the elements described in the following exemplary embodiment are for example only to the end, and it is not the purpose to that the technological scope of the present invention is limited.

In the following exemplary embodiments, a component is a designed element so that a developer can reuse it later when building an information system. The component is a concept including both a software component and a hardware component. A model is an expression (it is also called a system model) which is expressed by using combination of these kinds of the components. For example, the model is expressed by using a model description language such as UML.

On the other hand, a sub-component is an element included in a component. For example, when there is an information system which includes a client, an application server and a database server, the component is "a client", "an application server" or "a database server" respectively. And, for example, sub-components of the client are "a HTTP client" and "an operation system". In the case of the comparison of hardware, CPU, NIC and so on can be nominated as the sub-component. Connection relationship and dependence relationship between the elements may be recognized as a part of "the components" or "the sub-components".

First Exemplary Embodiment

As shown in FIG. 1, an information processing device 1000 according to the exemplary embodiment includes a component correspondence determination unit 20 and a similarity computation unit 30. Among there, the component correspondence determination unit 20 determines correspondence relationship between the components included among two system models A and B on the basis of the commonality of sub-components included in the components, and outputs a correspondence as a data indicating determined correspondence relationship between the components. Moreover, a similarity computation unit 30 calculates the similarity of two system models on the basis of data indicating correspondence relationship between the components determined by the component correspondence determination unit 20, that is on the basis of a correspondence.

By the above-mentioned configuration, the information processing device 1000 can calculate more appropriate similarity on the basis of considering up to the sub-components of each component included in the model. Consequently, the information processing device 1000 can build a more efficient information system. In other words, in order to efficiently build the information system, the exemplary embodiment aims to improve search accuracy of a similar model. Moreover, in order to improve the search accuracy of the similar model, the exemplary embodiment highly advanced the calculation method of model similarity.

Second Exemplary Embodiment

The second exemplary embodiment of the present invention will be described with referring FIG. 2 to FIG. 8.

[Functional Configuration]

Figure 2:
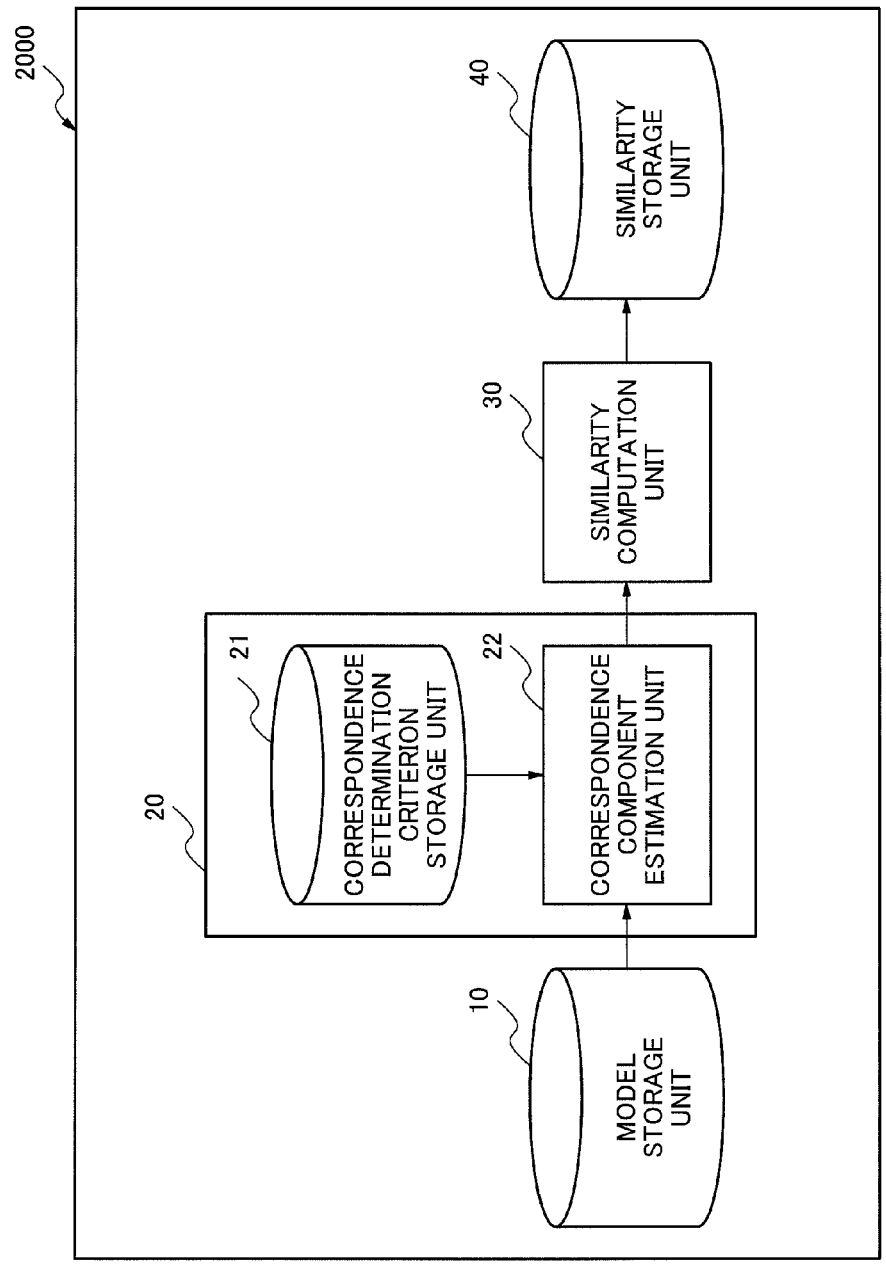
FIG. 2 A figure showing a functional configuration of the information processing system as the second exemplary embodiment of the present invention.

An information processing system 2000 as the exemplary embodiment includes the functional configuration as shown in FIG. 2. In FIG. 2, a model storage unit 10 stores a system model which includes at least one component. For example, the model storage unit 10 stores a model of a computer system which is described using a plurality of model description languages. And, the model storage unit 10 can store an incomplete system model which is under building.

A correspondence determination criterion storage unit 21 stores a criterion (it is also called as a correspondence determination criterion) for determining correspondence relationship between components which are included among two system models and are retrieved from the model storage unit 10 as a data. And, a correspondence component estimation unit 22 estimates correspondence relationship between the components included in the system model which is retrieved from the model storage unit 10 on the basis of the correspondence determination criterion stored in the correspondence determination criterion storage unit 21, and outputs it as correspondence.

The similarity computation unit 30 receives the correspondence from the component correspondence determination unit 20 and calculates the similarity between two system models retrieved from the model storage unit 10 on the basis of correspondence relationship between the components. A similarity storage unit 40 stores the similarity which the similarity computation unit 30 calculated as a data.

The correspondence determination criterion storage unit 21 stores a determination formula (hereinafter, called "a component correspondence computation formula") of the correspondence components used to determine whether or not a component is a certain component at the correspondence component estimation unit 22, that is a component which has correspondence relationship with a component, and a threshold value used for determining whether or not it is the correspondence component, as the correspondence determination criterion respectively. FIG. 6 is a figure which shows the example of a component correspondence computation formula as the correspondence determination criterion, and a model similarity computation formula 131b for calculating the model similarity. The correspondence component estimation unit 22 determines whether or not it includes the same function as the function realized by the component, by comparing between the sub-components of each component.

Specifically, the correspondence component estimation unit 22 compares the components included among two models in a round robin method, and creates a plurality of the first correspondence for all the combinations of components among two system models using the component correspondence computation formula 131a. After that, the correspondence component estimation unit 22 compares each first correspondence with a threshold value and makes the first correspondence which is the threshold value or over the second correspondence. The second correspondence is outputted to the similarity computation unit 30. The similarity computation unit 30 calculates the similarity between two system models using the correspondence between the components which is estimated that there is a correspondence relationship by the correspondence component estimation unit 22.

[Hardware Configuration]

Figure 3:
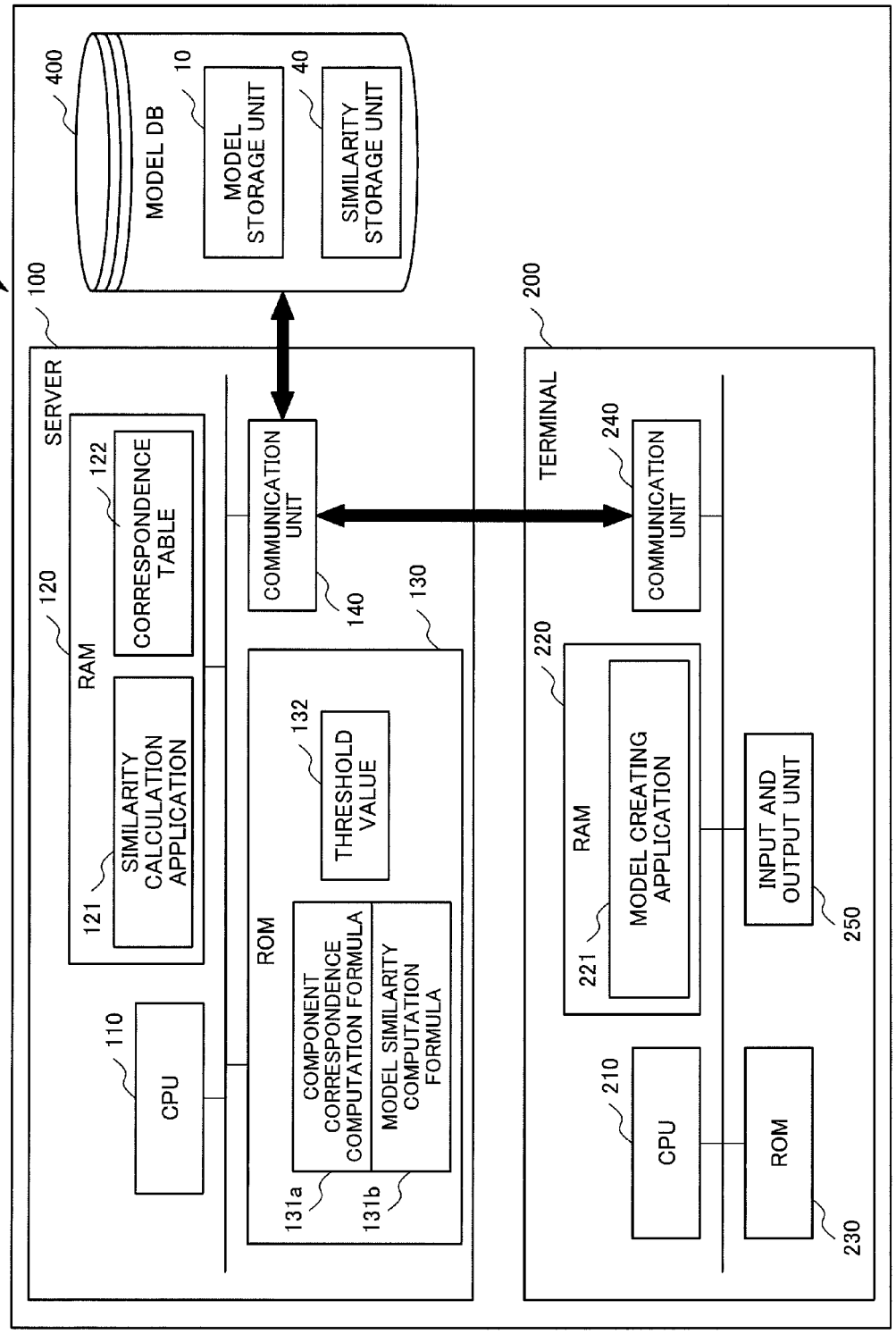
FIG. 3 A figure showing a hardware configuration of the information processing system as the second exemplary embodiment of the present invention.

Then, the example of the hardware configuration of the information processing system 2000 which realizes the functional configuration of FIG. 2 is shown in FIG. 3. As shown in FIG. 3, the information processing system 2000 includes a server 100, a terminal 200 and a model database 400. The server 100 includes a RAM 120, a ROM 130 and a communication unit 140 other than a CPU 110. The ROM 130 stores a program which is executed by the CPU. On the other hand, the terminal 200 includes a RAM 220, a ROM 230, a communication unit 240 and an input and output unit 250 other than a CPU 210. In the RAM 220 in the terminal 200, a model creating application 221 is included. A user builds a system model using this application. The system model is sent from the terminal 200 to the server 100, and is stored in the model storage unit 10 of the model database 400 via the communication unit 140.

The RAM 120 of the server stores the similarity calculation application 121 which calculates the similarity. The CPU 110 executes this similarity calculation application 121. The ROM 130 stores the component correspondence computation formula 131a, the model similarity computation formula 131b and a threshold value 132 for determining the correspondence component.

Further, the correspondence determination criterion storage unit 21, the correspondence component estimation unit 22 and the similarity computation unit 30 in FIG. 2 are configured using the CPU 110, the RAM 120 and the ROM 130. And, the model storage unit 10 and the similarity storage unit 40 are configured using the model database 400.

The correspondence calculated by the component correspondence computation formula 131a is stored in a correspondence table 122 of the RAM 120, and is used when the similarity calculation application 121 calculates the similarity. And, the model database 400 includes the similarity storage unit 40 for storing the similarity calculated using the similarity calculation application 121.

Figure 4:
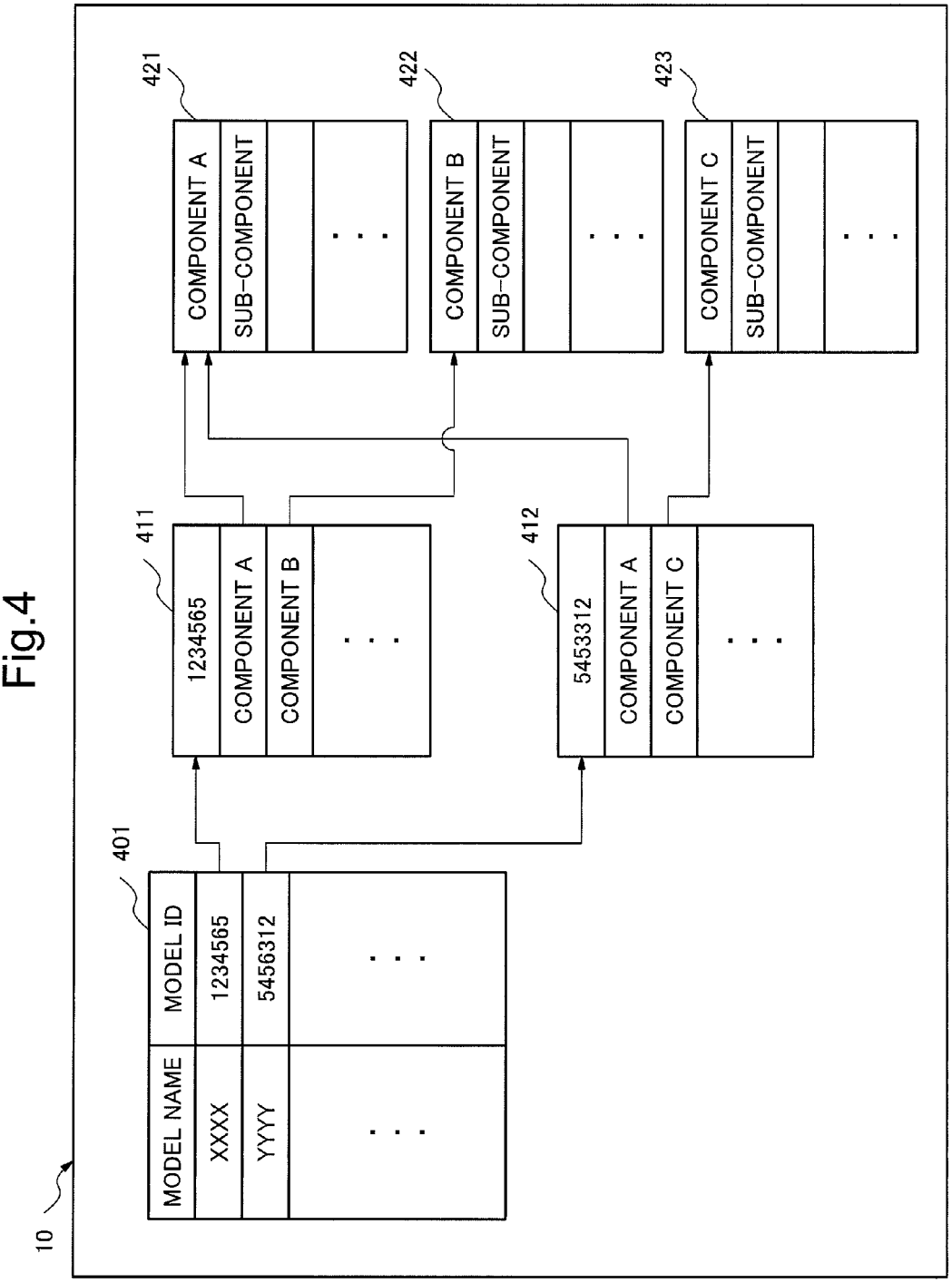
FIG. 4 A figure showing contents of a model storage unit of the information processing system as the second exemplary embodiment of the present invention.

The model storage unit 10 stores the information relating with the model as shown in FIG. 4. In other words, the model storage unit 10 stores a table 401 in which correlates a model name with a model ID as an identifier. And, the model storage unit 10 stores a table 411 and a table 412 indicating components included in each model. And, the model storage unit 10 stores a table 421, a table 422 and a table 423 indicating sub-components included in each component. Moreover, the model storage unit 10 also stores correspondence relationship (pointer) between those tables as shown by arrows. Thus, the model storage unit 10 stores the information about the system model so that it becomes clear that what kind of component is included in which model, and what kind of sub-component is included in which component.

Figure 5:
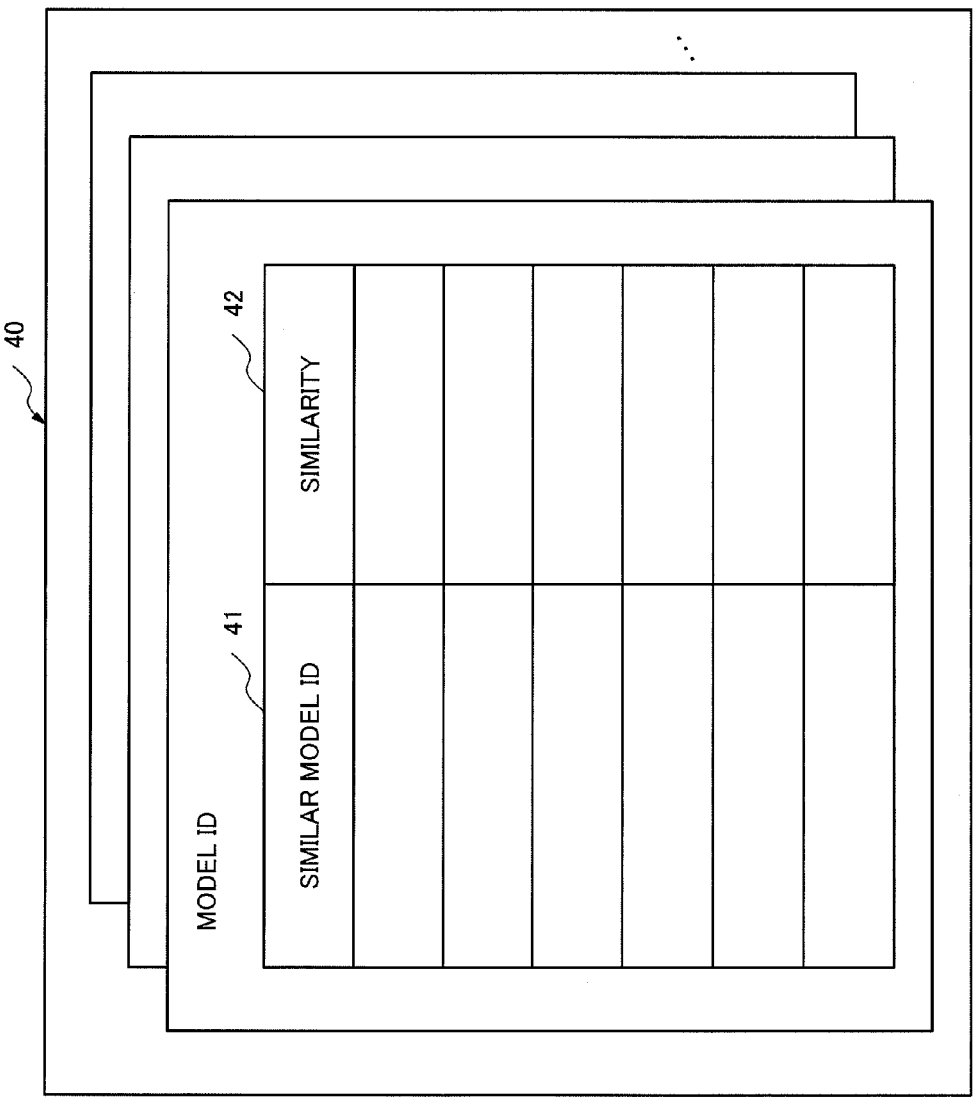
FIG. 5 A figure showing contents of a similarity storage unit of the information processing system as the second exemplary embodiment of the present invention.

On the other hand, as shown in FIG. 5, the similarity storage unit 40 correlates a model ID 41 of the comparative model which is determined to be similar and each similarity 42 with the comparative model, and stores them for each criterion model. Here, the criterion model is a model which is a criterion for calculating the similarity.

FIG. 7 is the figure showing the internal configuration of the correspondence table 122 stored in the RAM 120. The CPU 110 compares the components respectively included among two models in a round robin method, calculates the correspondence for all the combination of the components using the component correspondence computation formula 131a and creates the correspondence table 122a. After that, the CPU 110 creates the correspondence table 122b consisting of the second correspondence by comparing the correspondence in the correspondence table 122a with a threshold value TH.

[Process Flow]

Figure 8:
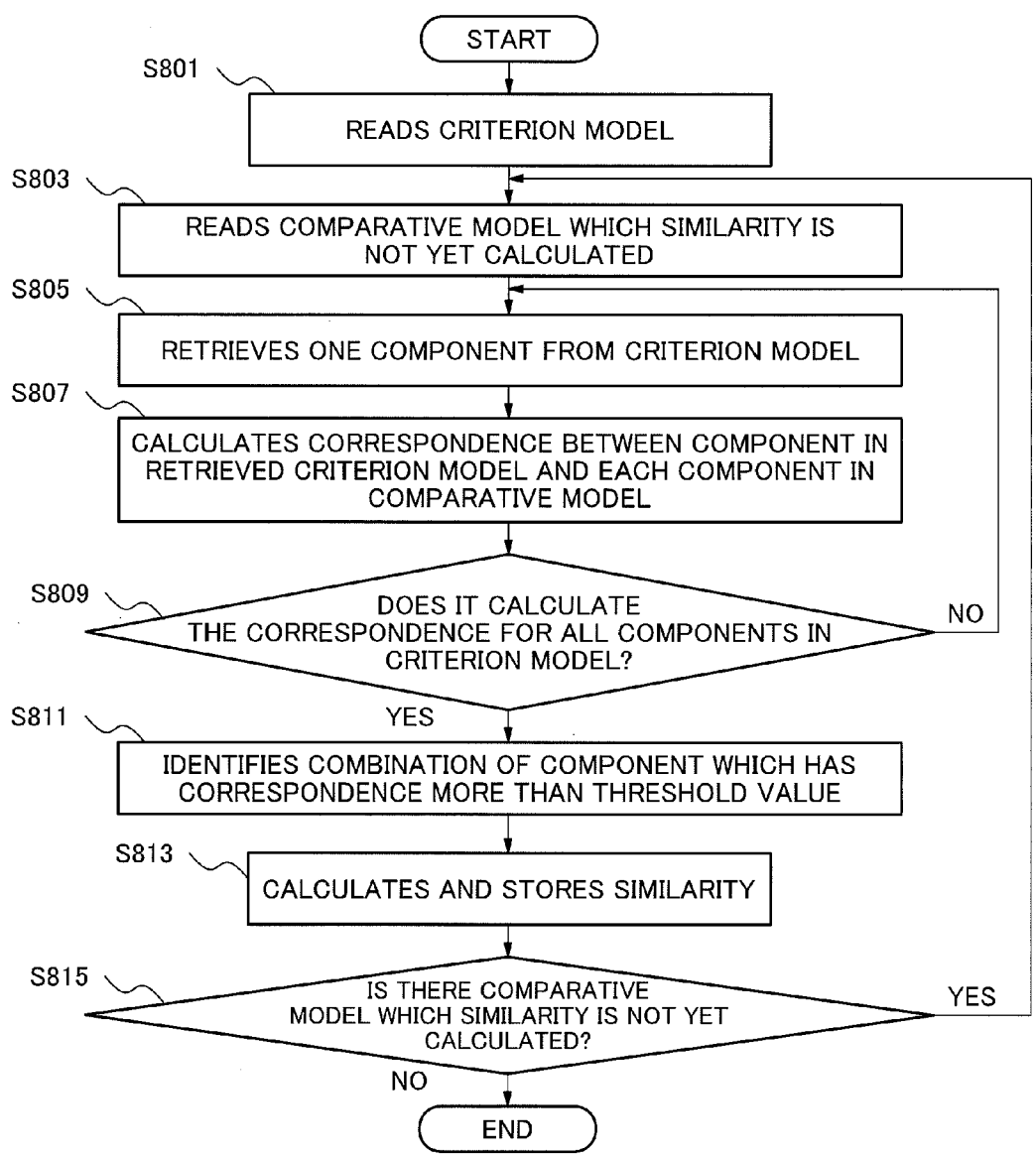
FIG. 8 A flowchart showing a flow of processes in the information processing system as the second exemplary embodiment of the present invention.

Then, the whole process of the exemplary embodiment is described in detail with reference to FIG. 8. At first, the correspondence component estimation unit 22 retrieves the criterion model from the model storage unit 10 (S801). Then, the correspondence component estimation unit 22 read out the models which are target models (comparative model) compared with the criterion model and are not yet calculated the similarity with the criterion model from the model storage unit 10 (S803).

Then, the correspondence component estimation unit 22 retrieves one component from the criterion model (S805), and calculates the correspondence between the retrieved component and each component in the comparative model on the basis of the correspondence determination criterion (S807). Specifically, the correspondence component estimation unit 22 calculates the correspondence using the component correspondence computation formula (131a in FIG. 6) as the correspondence determination criterion. In the component correspondence computation formula 131a, fs is each sub-component of a component of the criterion model. And, FS is each sub-component of a component of the comparative model. And, barred fs is a set of the sub-components included in the component of the criterion model. And, barred FS is a set of the sub-components included in the component of the comparative model. Moreover, s(fs, FS) is a function which is 1 when fs and FS are same, and is 0 in other cases. Num(x) is a function representing number of elements in set x. In other words, here, the denominator of the component correspondence computation formula 131a indicates summation of number of the sub-components included in the component of the criterion model and number of the sub-components included in the component of the comparative model. On the other hand, in the model similarity computation formula 131b, max(a, b) is a function which becomes "a" when a>b and becomes "b" when a<b.

Then, when advancing towards Step S809, the correspondence component estimation unit 22 determines whether or not calculating the correspondence for all components in the criterion model, and returns to Step S805 and repeats the processes when component which is not yet calculated the correspondence exists. The correspondence component estimation unit 22 advances towards Step S811 when it calculated the correspondence between all components in the criterion model and each component in the comparative model.

All the correspondence (first correspondence) which are calculated as is described above are stored in the correspondence table 122a in FIG. 7. In FIG. 7, b(Ax,Ay) indicates the correspondence between a component A of a criterion model X and a component A of a comparative model Y. Specifically, the correspondence component estimation unit 22 calculates using the component correspondence computation formula 131a in FIG. 6. In Step S811, the correspondence component estimation unit 22 identifies a combination of the component which has the correspondence (second correspondence) more than the threshold value 132, and creates the correspondence table 122b in FIG. 7.

Moreover, in Step S813, the similarity computation unit 30 calculates a similarity S using a value (second correspondence) in the correspondence table 122b and the model similarity computation formula 131b shown in FIG. 6, and stores it in the similarity storage unit 40. Moreover, in Step S815, the similarity computation unit 30 determines whether or not there exists a comparative model in which the similarity is not yet calculated. If a comparative model in which the similarity is not yet calculated exists, the information processing system 2000 repeats the processes of step S803 to S813.

[Effect of the Exemplary Embodiment]

Based on the above mentioned processes, the information processing system 2000 calculates the correspondence between the components considering even for correspondence relationship of the sub-components, and calculates the similarity between the criterion model and the comparative model. Therefore, a reliability of final similarity becomes high. Accordingly, a system developer can effectively retrieve a model which can be referred on designing concretely the criterion model from the database.

Third Exemplary Embodiment

The third exemplary embodiment of the present invention will be described with referring FIG. 9 and FIG. 10.

[Functional Configuration]

Figure 9:
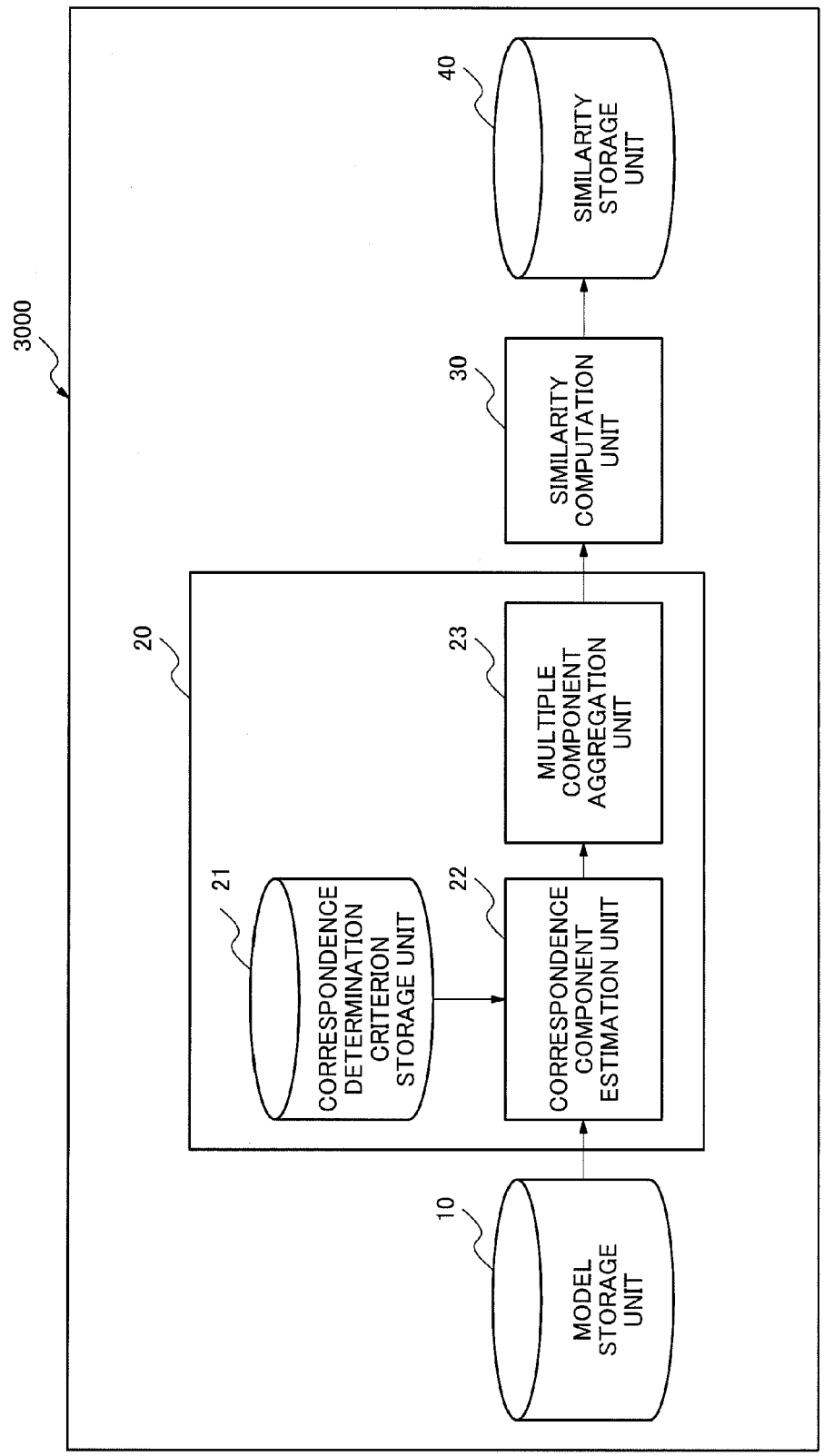
FIG. 9 A figure showing a functional configuration of the information processing system as the third exemplary embodiment of the present invention.
Figure 10:
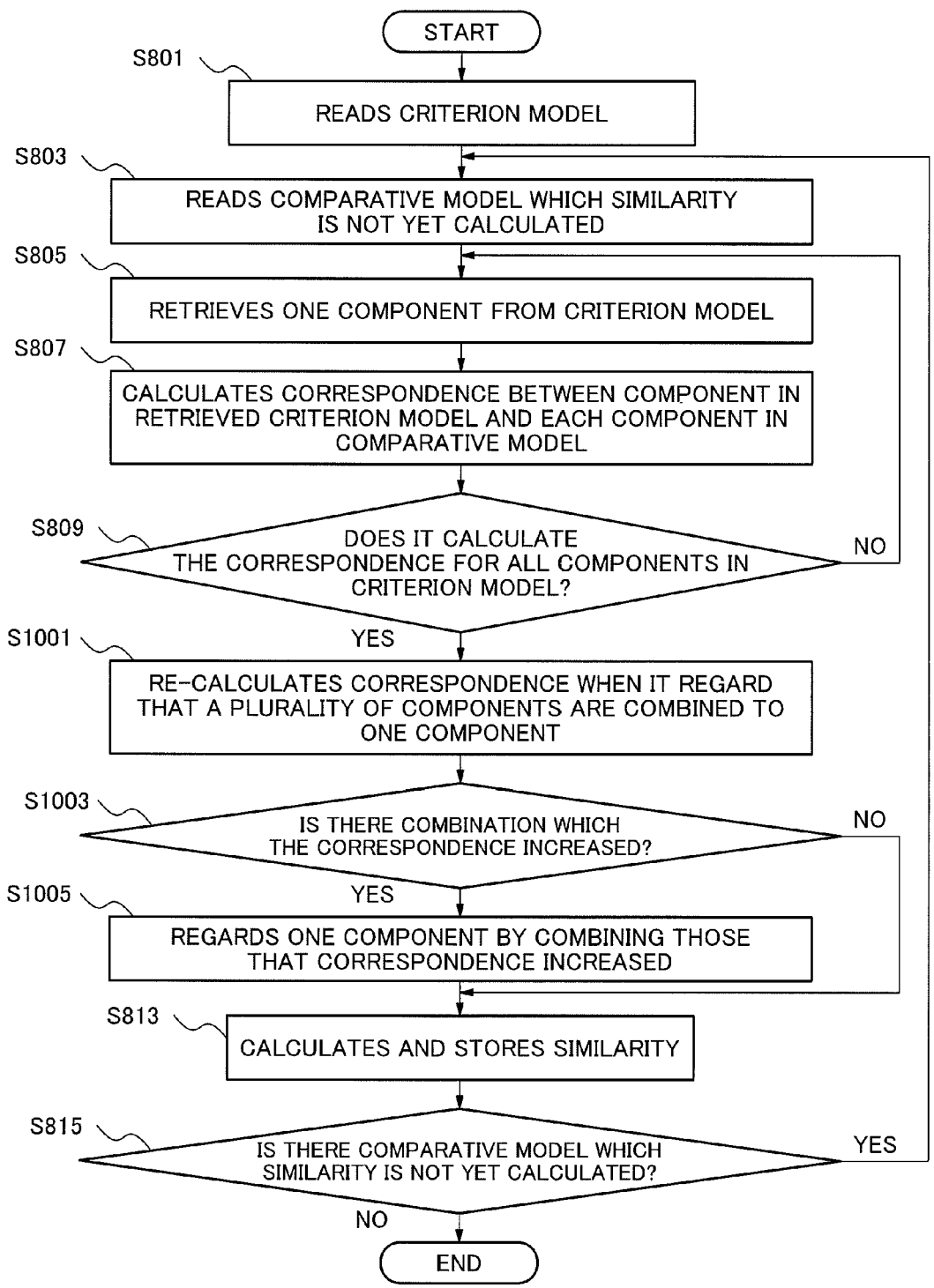
FIG. 10 A flowchart showing a flow of processes in the information processing system as the third exemplary embodiment of the present invention.

The information processing system 3000 as the exemplary embodiment includes the functional configuration as shown in FIG. 9. The difference from the information processing system 2000 as the second exemplary embodiment is a point including a multiple component aggregation unit 23. The model storage unit 10 stores a model of the computer system described using a plurality of model description languages. The correspondence determination criterion storage unit 21 stores the correspondence determination criterion for determining correspondence relationship among the components which are included in two models retrieved from the model storage unit 10. And, the correspondence component estimation unit 22 estimates correspondence relationship among the components which are included in models retrieved from the model storage unit 10 on the basis of the correspondence determination criterion stored in the correspondence determination criterion storage unit 21.

The multiple component aggregation unit 23 furthermore expands correspondence relationship among the components estimated by the correspondence component estimation unit 22, and further clarifies the similarity with the other model on the basis of regarding one component by aggregating two or over components of one model. The similarity computation unit 30 calculates the similarity among the models on the basis of the correspondence data (correspondence) indicating correspondence relationship between the components. The similarity storage unit 40 stores the similarity which the similarity computation unit 30 calculated.

[Process Flow]

Then, whole processes of the exemplary embodiment will be described in detail with referring FIG. 10. Because Steps S801 to S809 are the same as that of the second exemplary embodiment described using FIG. 8, the detailed descriptions are omitted thereof at present.

In Steps S801 to S809, the correspondence component estimation unit 22 calculates all the correspondence of each component between the criterion model and the comparative model, and creates the correspondence table 122b of FIG. 7. Then, in Step S1001, the multiple component aggregation unit 23 calculates correspondence (third correspondence) when regarding a single component by aggregating a plurality of components again. Then, to advance towards Step S1003, and the multiple component aggregation unit 23 determines whether or not the third correspondence, which is regarded a single component by aggregating a plurality of components, increases compared with the correspondence (second correspondence) when it is not regarded so. For example, when all the sub-components included in at least two components in one model are identical with all the sub-components included in at least one component in the other motel, determination at present will be YES.

When finding a combination in which the correspondence increases, to advance towards Step S1005, the multiple component aggregation unit 23 regards a single component by aggregating a combination in which correspondence is increased. Then, to advance towards Step S813, the similarity computation unit 30 calculates the similarity in the same way of the second exemplary embodiment on the basis of the third correspondence and stores it in the similarity storage unit 40.

When at least two components included in one model are in correspondence relationship with at least one component included in the other model, the information processing system 3000 of the exemplary embodiment aggregates a plurality of components and calculates the similarity. Based on the process, the information processing system 3000 can appropriately reflect the connection relationship between the components to the similarity.

Fourth Exemplary Embodiment

The fourth exemplary embodiment of the present invention will be described in detail with referring to FIG. 11 and FIG. 12.

[Functional Configuration]

Figure 11:
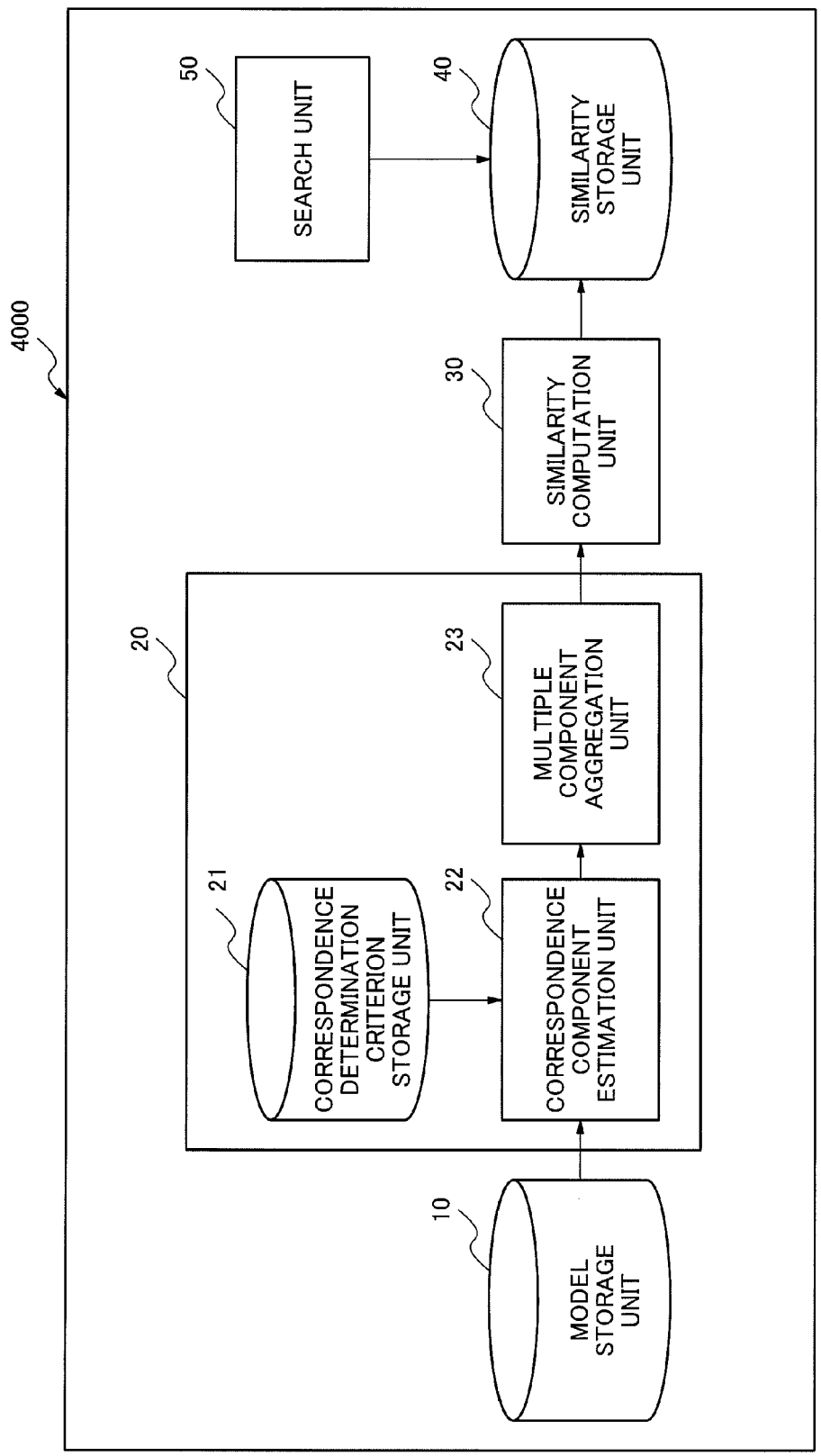
FIG. 11 A figure showing a functional configuration of the information processing system as the fourth exemplary embodiment of the present invention.
Figure 12:
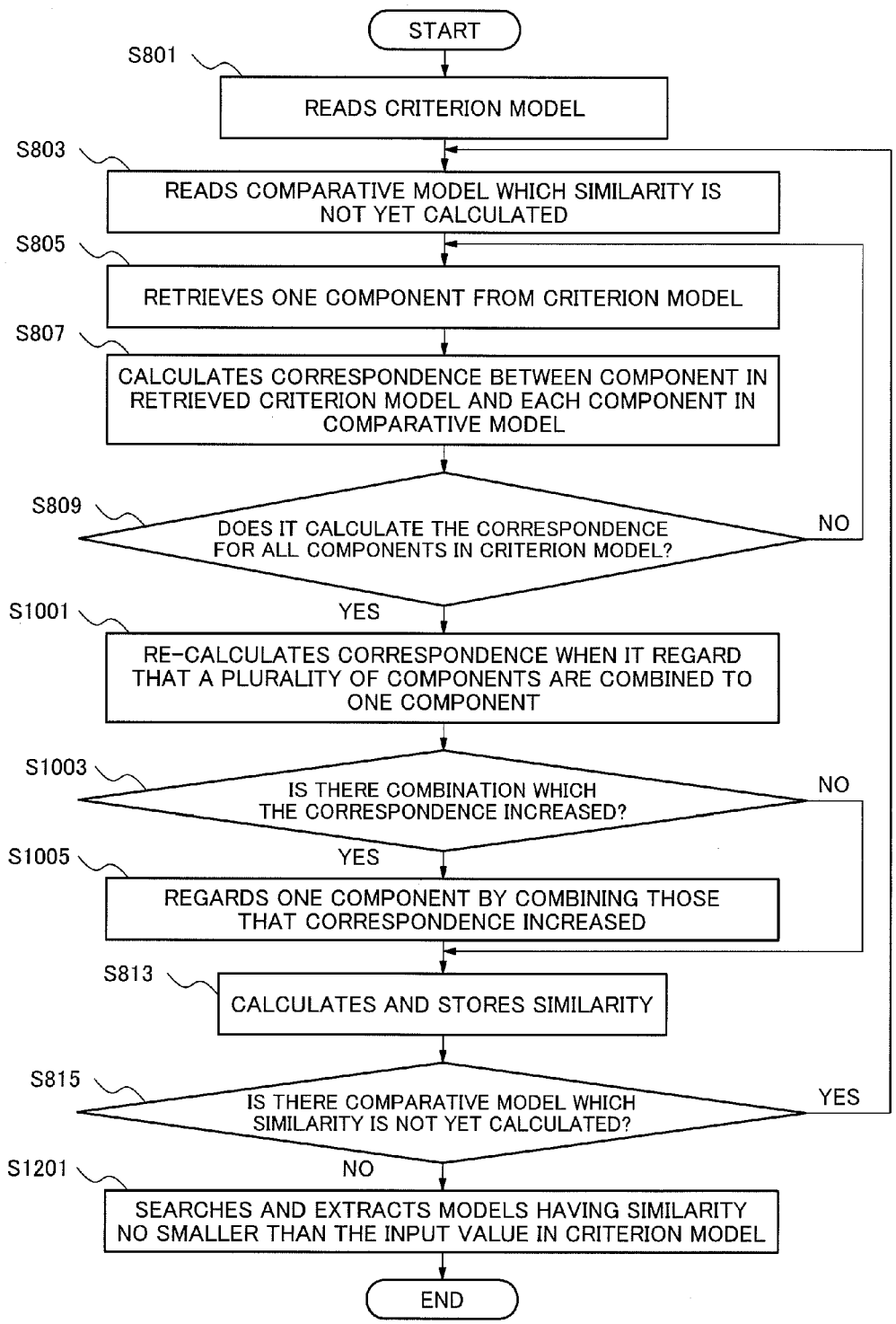
FIG. 12 A figure showing a functional configuration of the information processing system as the fourth exemplary embodiment of the present invention.

An information processing system 4000 as the exemplary embodiment has the functional configuration as shown in FIG. 11. The difference from the information processing system 3000 as the third exemplary embodiment is a point including a search unit 50. The search unit 50 inputs information (for example model name and model ID) specifying a model which is a criterion and a range of similarity for the criterion model. Then, the search unit 50 refers to the similarity storage unit 40 and specifies the model which is included in the inputted range of the similarity from the criterion model. Because other configurations are the same as that of the third exemplary embodiment, the same element are attached the same code and the descriptions are omitted thereof.

[Process Flow]

Then, whole the processes of the exemplary embodiment will be described in detail with referring FIG. 12. Because Steps S801 to S815 are the same as that of the third exemplary embodiment described with referring FIG. 10, the descriptions are omitted thereof at present.

After Steps S801 to S1005, in S813 and S815, the similarity computation unit 30 calculates the similarity of the criterion model and the comparative model. Then, in Step S1201, the search unit 50 searches, by referring to the similarity storage unit 40, a model having the similarity which is the input value or over to the criterion model using the input value of the similarity as a search key. Then, using the searched result, it retrieves the desired model from the model storage unit 10.

According to the exemplary embodiment, in addition to the effect of the above-mentioned third exemplary embodiment, it has an effect that a search extraction of the model can be done more accurately.

Specific Example

Figure 13:
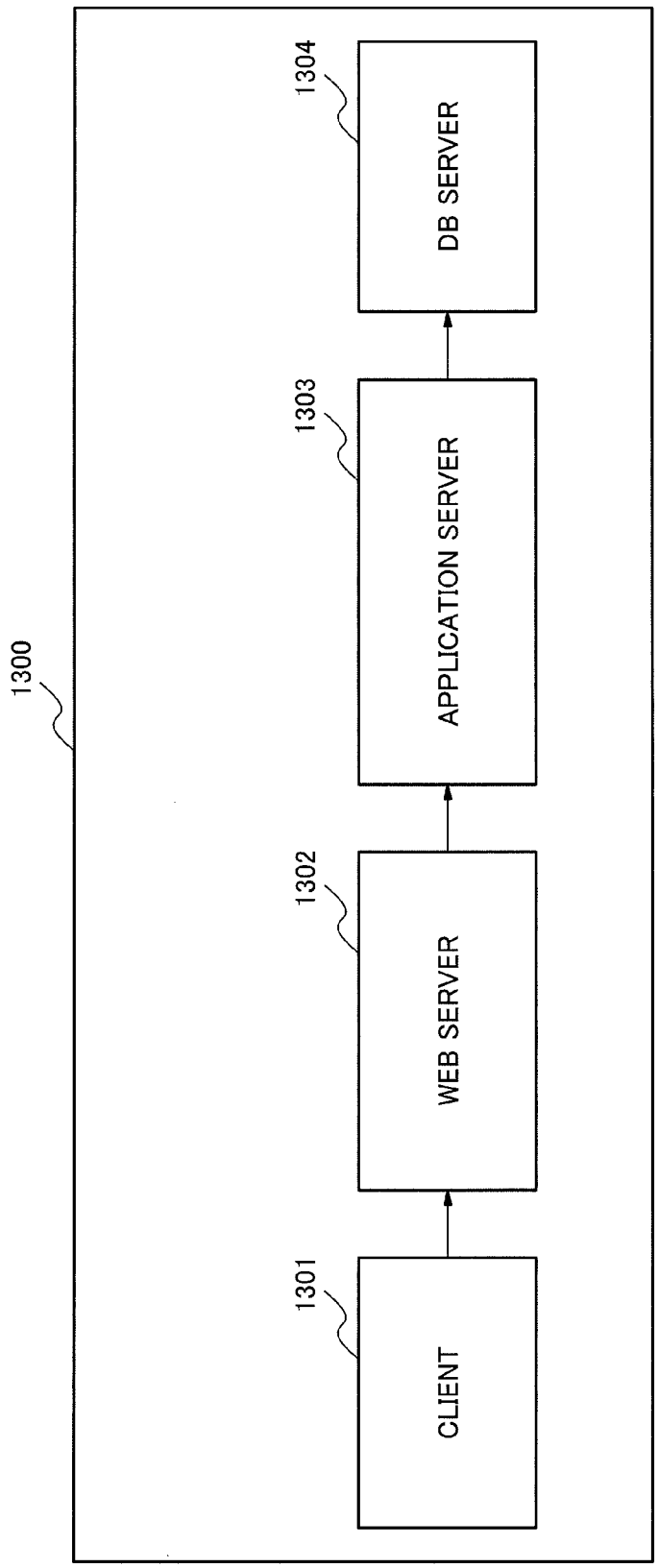
FIG. 13 A figure showing an example of a comparative model in order to describe a specific example of the fourth exemplary embodiment of the present invention.
Figure 14:
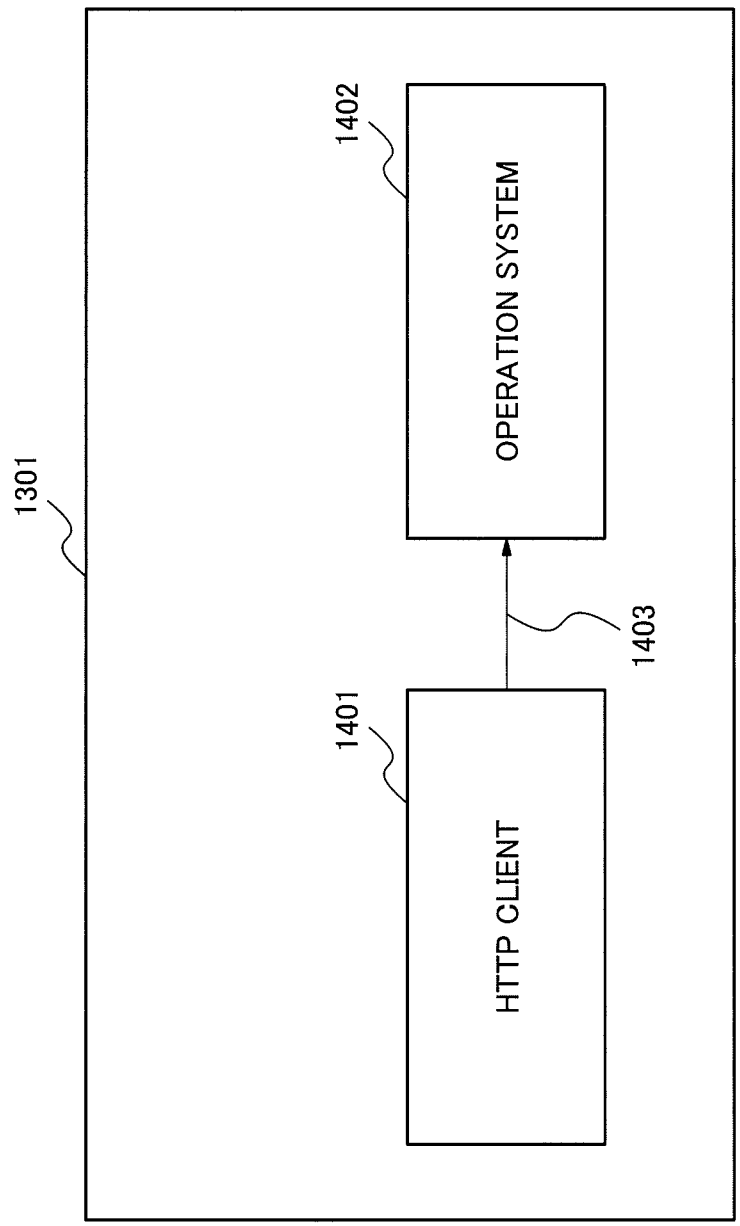
FIG. 14 A figure illustrating an example of sub-components of a client of a comparative model in order to describe a specific example of the fourth exemplary embodiment of the present invention.
Figure 15:
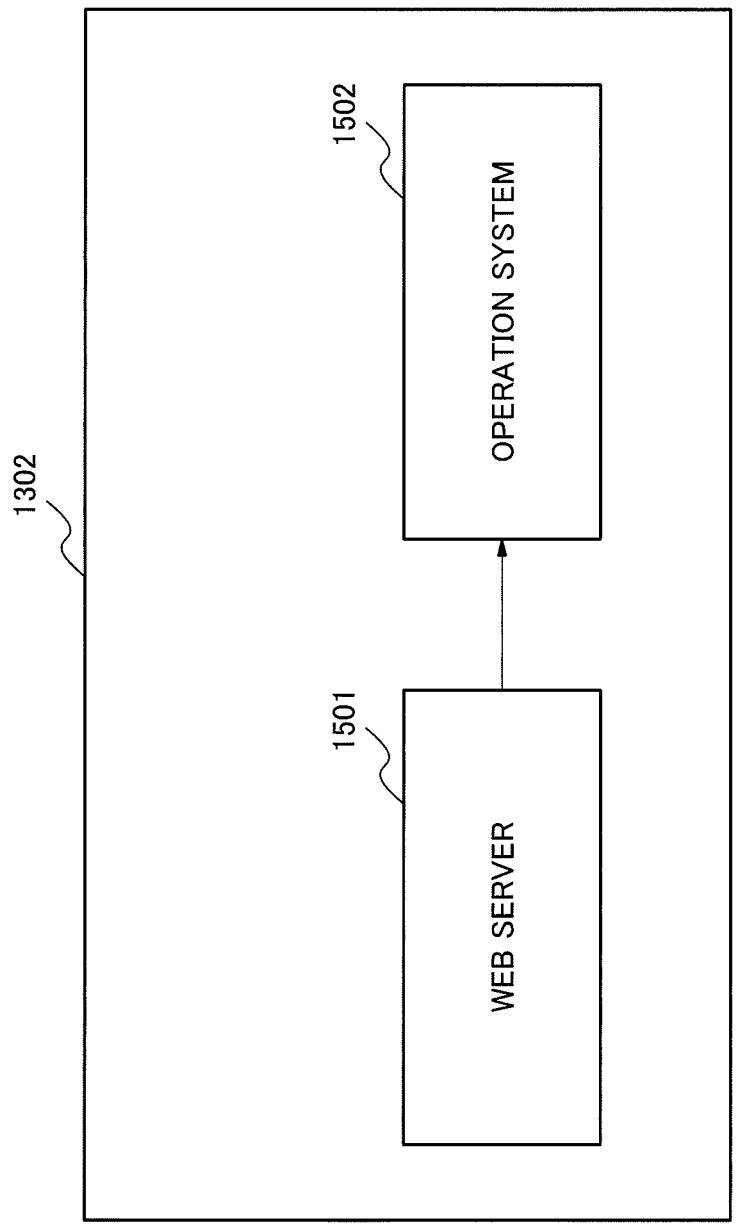
FIG. 15 A figure illustrating an example of sub-components of a Web server of a comparative model in order to describe a specific example of the fourth exemplary embodiment of the present invention.
Figure 16:
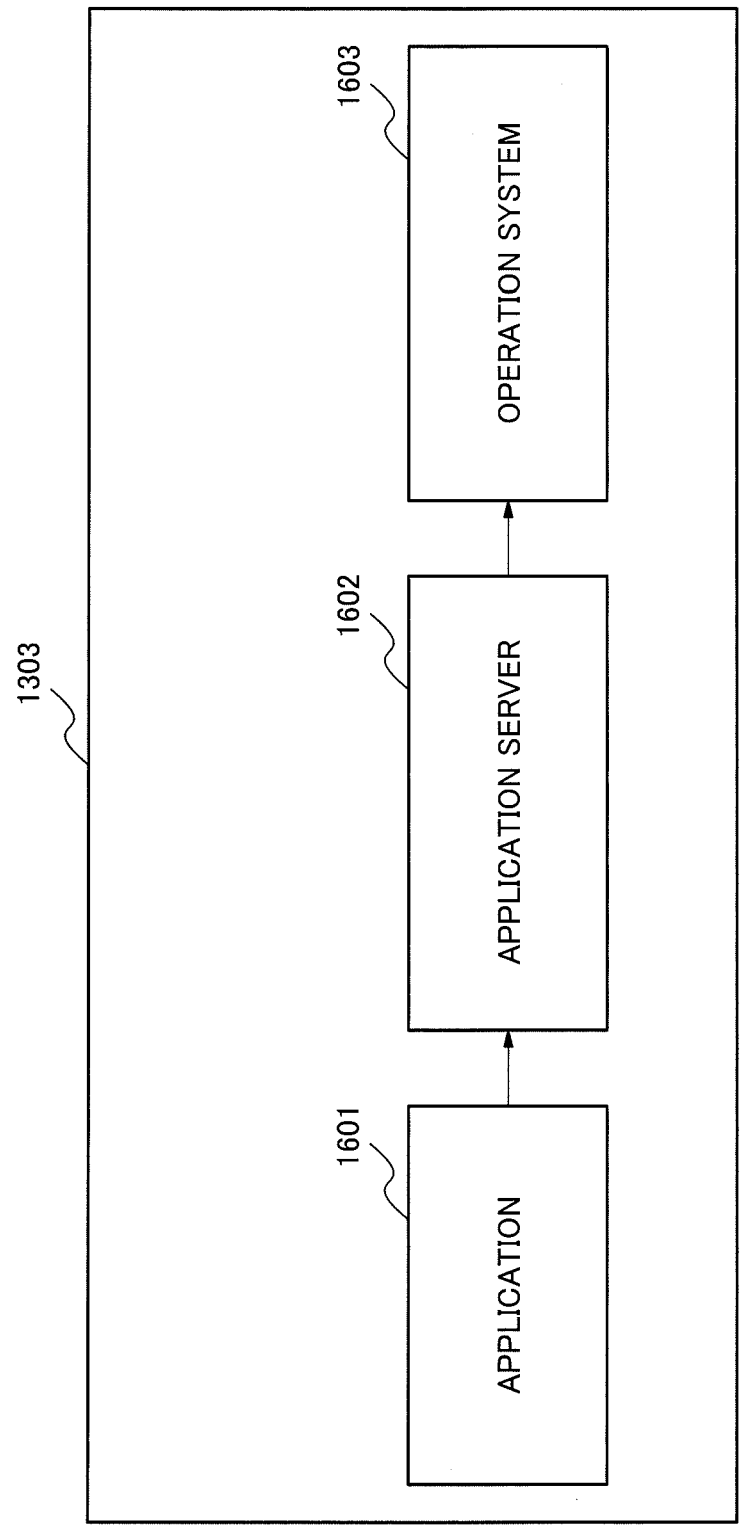
FIG. 16 A figure illustrating an example of sub-components of an application server of a comparative model in order to describe a specific example of the fourth exemplary embodiment of the present invention.
Figure 17:
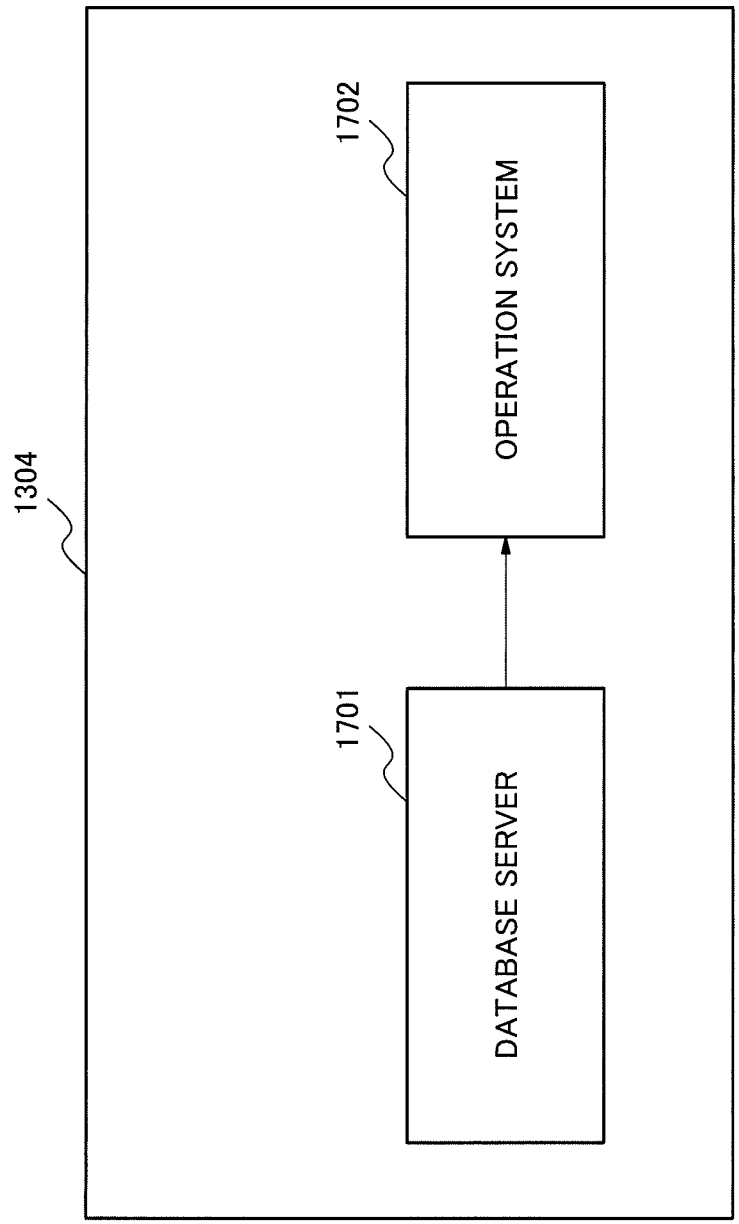
FIG. 17 A figure illustrating an example of sub-components of a database server of a comparative model in order to describe a specific example of the fourth exemplary embodiment of the present invention.

The specific example of the system applied the exemplary embodiment will be described using FIG. 13 to FIG. 22. FIG. 13 shows a system model 1300 as the comparative model including four hardware components which are a client 1301, a Web server 1302, an application server 1303 and a database server 1304. FIG. 14 is the figure illustrating the sub-components of the client 1301. In the specific example, the client 1301 includes a HTTP client 1401 and an operation system 1402 as software components. FIG. 15 is the figure illustrating the sub-component of the Web server 1302. In the specific example, the Web server 1302 includes a Web server 1501 and an operation system 1502 as software components. FIG. 16 is the figure illustrating the sub-component of the application server 1303. In the specific example, the application server 1303 includes an application 1601, an application server 1602 and an operation system 1603 as software components. FIG. 17 is the figure illustrating the sub-components of the database server 1304. In the specific example, the database server 1304 includes a database server 1701 and an operation system 1702 as software components.

Figure 18:
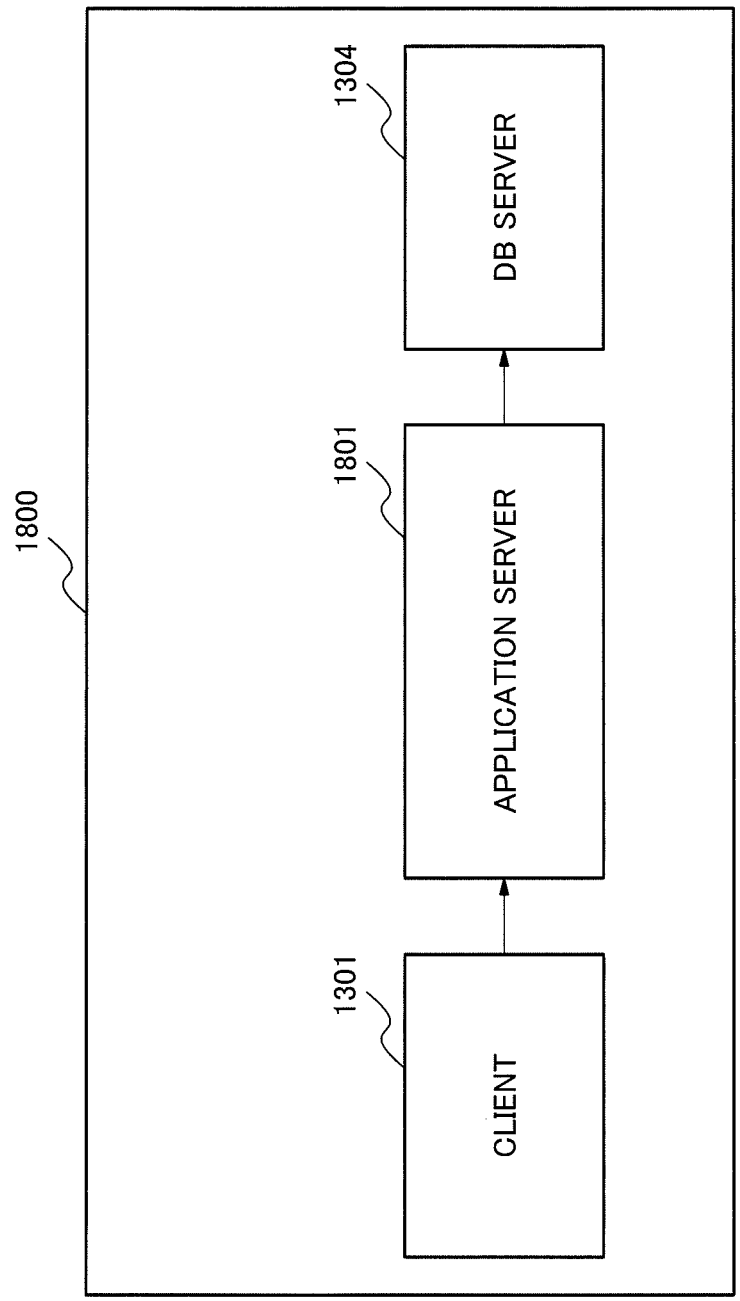
FIG. 18 A figure showing an example of a criterion model in order to describe a specific example of the fourth exemplary embodiment of the present invention.
Figure 19:
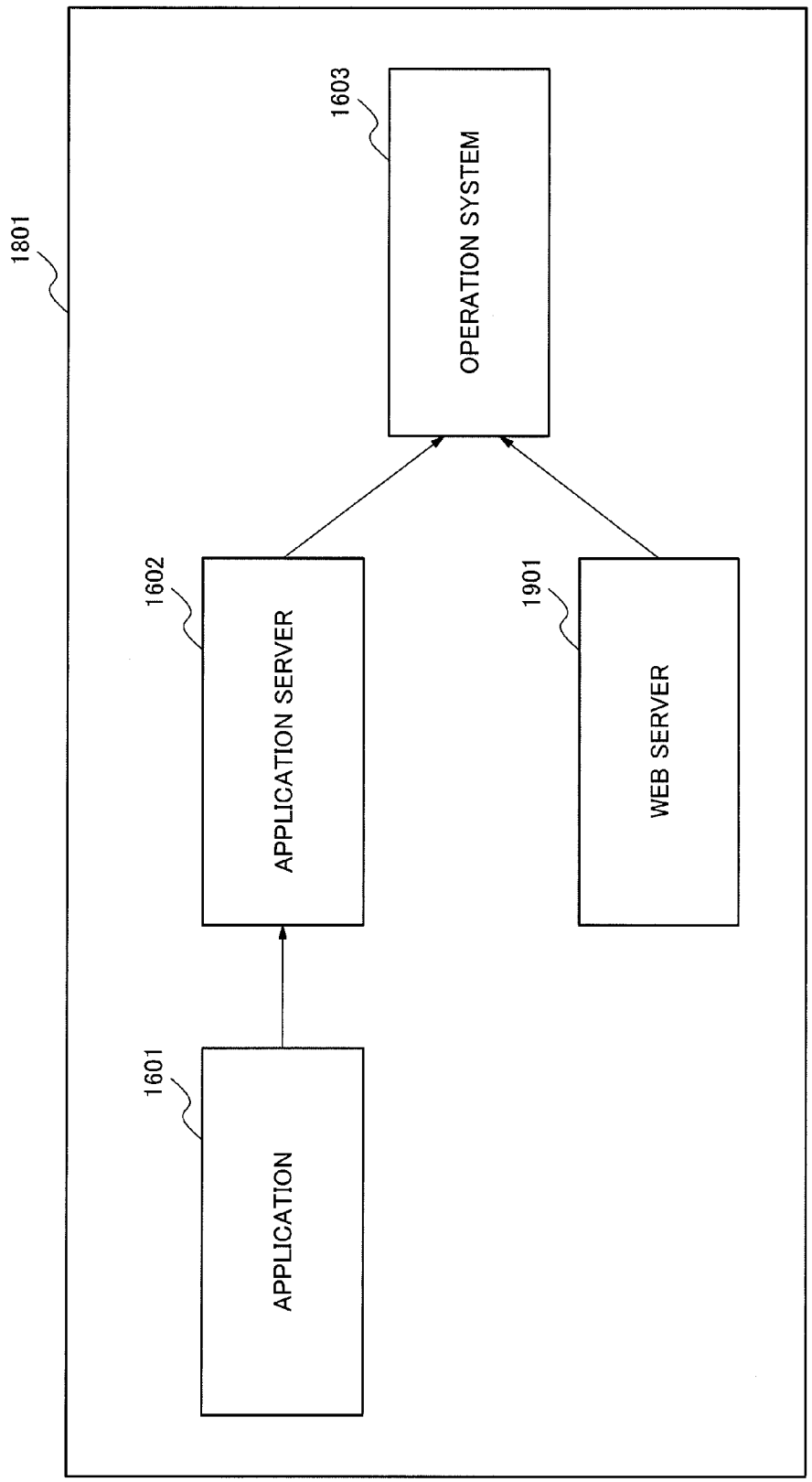
FIG. 19 A figure illustrating an example of sub-components of an application server of a criterion model in order to describe a specific example of the fourth exemplary embodiment of the present invention.

FIG. 18 shows a system model 1800 as the criterion model including three hardware components which are the client 1301, an application server 1801 and the database server 1304. FIG. 19 is the figure illustrating the sub-component of the application server 1801. In the specific example, the application server 1801 includes a Web server 1901 as a software component other than the application 1601, the application server 1602 and the operation system 1603.

Figure 20:
FIG. 20 A figure illustrating an example of a correspondence table in order to describe a specific example of the fourth exemplary embodiment of the present invention.

The correspondence, which is between each component including in the system model 1300 and the system model 1800 and is calculated by the correspondence component estimation unit 22 using the component correspondence computation formula 131$a$ shown in FIG. 6, is shown in the table 2001 of FIG. 20.

For example, when comparing the system model 1300 and the system model 1800, because the client 1301 and the database server 1304 are common, the correspondence of them is 1. On the other hand, when considering correspondence relationship between the sub-components of the client 1301 of the system model 1300 (FIG. 14) and the sub-components of the application server 1801 of the system model 1800 (FIG. 19), the same sub-component included is only the operation system. Accordingly, number of the common components is 1. By substituting the numerical value in the component correspondence computation formula 131$a$ in FIG. 6, the correspondence becomes $2*1/(2+4)=0.33$. Similarly, the correspondence of the client in FIG. 18 and the database server in FIG. 13 becomes $2*1/(2+2)=0.5$.

On the other hand, when considering correspondence relationship between the sub-components of the Web server 1302 of the system model 1300 (FIG. 15) and the sub-components of the application server 1801 of the system model 1800 (FIG. 19), two sub-components which are the Web server and the operation system are common. Accordingly, the correspondence becomes $2*2/(2+4)=2/3$ (=about 0.66).

Then, it is considered that correspondence relationship between the sub-components of the application server 1303 of the system model 1300 (FIG. 16) and the sub-components of the application server 1801 of the system model 1800 (FIG. 19). In this case, three sub-components which are the application, the application server and the operation system are common. Accordingly, the correspondence becomes $2*3/(3+4)=6/7$ (=about 0.86).

In the same way, the correspondence component estimation unit 22 calculates the correspondence of the all combination of sub-components, and creates the table 2000 of FIG. 20. Then, the correspondence component estimation unit 22 extracts the combinations of the sub-components having the correspondence larger than threshold value 0.6 of the correspondence and creates the table 2101 of FIG. 21. Based on this, it finds out that the client is correlated with the client, the combination of the Web server and the application server is correlated with the application server and the database server is correlated with the database server. In an example in FIG. 21, the similarity computation unit 30 calculates the similarity with $1-\{(1-0.66)+(1-0.86)\}/4=0.88$, using the formula shown in FIG. 6.

Figure 21:
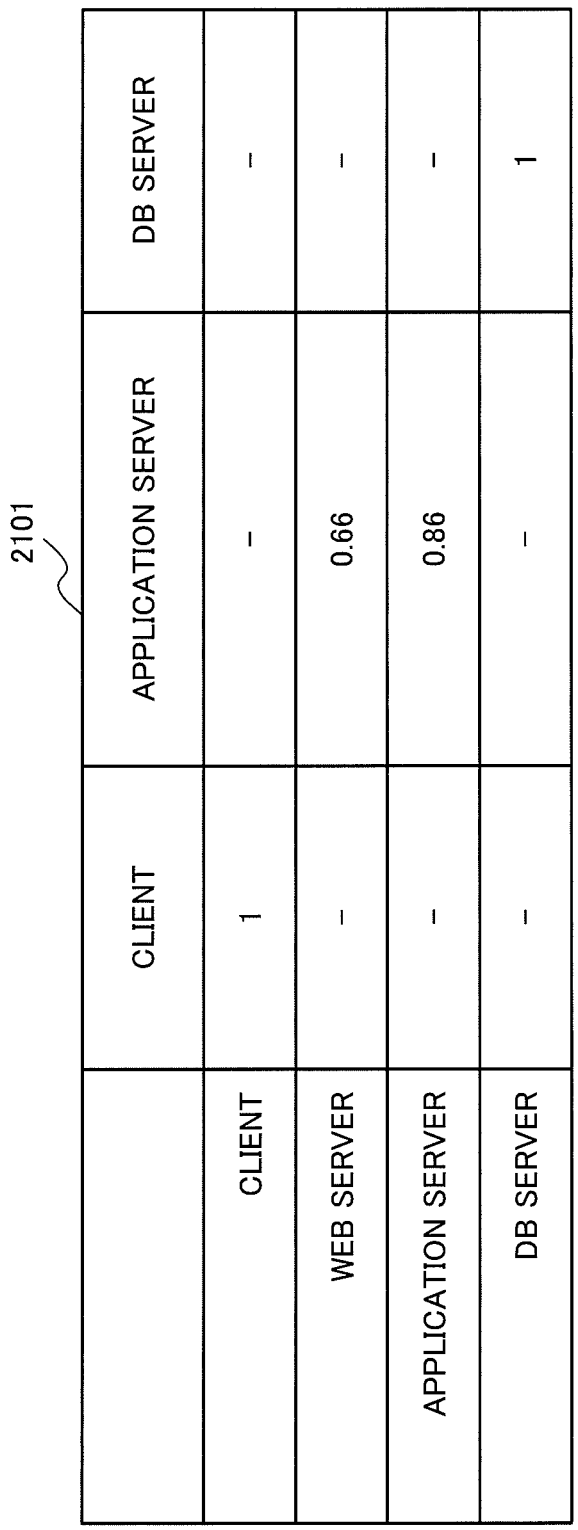
FIG. 21 A figure illustrating an example of a correspondence table in order to describe a specific example of the fourth exemplary embodiment of the present invention.

When single component and a plurality of components are in correspondence relationship as shown in FIG. 21, the multiple component aggregation unit 23 handles it as single component by aggregating a plurality of components. In this specific example, the application server 1801 is correlated with the Web server 1302 and the application server 1303. Accordingly, the multiple component aggregation unit 23 handles the Web server 1302 and the application server 1303 as single component. The correspondence component estimation unit 22 re-calculates the correspondence between the components when thinking like that, and registers $1-(1-0.66)*(1-0.86)=0.95$ in the table 2201 as shown in FIG. 22. In this time, the component name is handled as the application server which is the correlated component, or is handled as having both name of the Web server or the application.

Then, the correspondence calculated in this manner is transmitted to the similarity computation unit 30. The similarity computation unit 30 calculates the similarity of the system model 1300 and the system model 1800. Here, $1-\{(1-1)/3+(1-0.95)/3+(1-1)/3\}=1-0.02=0.98$ is calculated as the similarity.

The similarity computation unit 30 stores the similarity calculated in this manner in the similarity storage unit 40. When a search formula is input to the similarity acquired in this manner from a user, the search unit 50 presents a necessary model to the user on the basis of the similarity. For example, when the similarity of 0.7 or over is specified, it is presented as the model which is similar to the above-mentioned comparative model. The similarity used for this kind of similarity search may be calculated in advance on each model combination. In addition, it can be calculated at any time.

Further, although the client 1301 and the Web server 1302 are connected with a straight line in FIG. 13, the straight line may be considered one of the components. In this case, for example, the component correspondence determination unit 20 determines that there is an edge which connects the client with the Web server. Then, when the Web server 1302 and the application server 1303 are handled as single component and the commonality that the edge is common is considered, the similarity of the system model 1300 and the system model 1800 becomes 1−{(1−0.95)/5=0.99.

Moreover, the connection relationship among the sub-components may be considered with including in the sub-components as an edge. For example, in FIG. 14, it may be considered that there is one edge 1403 between the client 1401 and the operation system 1402, and then the information processing system may compare it with other components.

Other Expressions of Exemplary Embodiment

A part or entire of the above-mentioned exemplary embodiments can also be described by the following supplementary notes. However, the present invention is not limited to the followings.

(Supplementary Note 1)

An information processing device, comprising:

a determination means for determining correspondence relationship between components which are included among two system models on the basis of commonality of sub-components included in said components; and a similarity calculation means for calculating similarity of said two system models on the basis of correspondence relationship between components determined with said determination means.

(Supplementary Note 2)

The information processing device described in the supplementary note 1, wherein said determination means calculates and outputs correspondence which is a data indicating determined correspondence relationship between components using commonality of said sub-component, and said similarity calculation means calculates similarity of said system model using said correspondence.

(Supplementary Note 3)

The information processing device described in the supplementary note 2, wherein said similarity calculation means calculates similarity of said system model using a second correspondence which is correspondence more than a predetermined threshold value among said correspondence.

(Supplementary Note 4)

The information processing device described in the supplementary notes 2 or 3, wherein said determination means, when determining said correspondence relationship between a first component included in a first system model and a second component included in a second system model, compares sub-components included in said first component and sub-components included in said second component and calculates said correspondence on the basis of number of matched sub-components.

(Supplementary Note 5)

The information processing device described in any one of the supplementary notes 1 to 4, further comprising:

a multiple component aggregation unit which, when at least two components included in one model are in correspondence relationship with at least one component included in the other model, determines said correspondence relationship in the case of regarding that a plurality of components are aggregated into single component, in that said similarity calculation means calculates similarity on the basis of the determined result of said correspondence relationship.

(Supplementary Note 6)

The information processing device described in any one of the supplementary notes 1 to 5, further comprising:

a search means for searching a model on the basis of similarity calculated by said similarity calculation means.

(Supplementary Note 7)

The information processing device described in any one of the supplementary notes 1 to 6, further comprising:

a model storage means for correlating and storing information on specifying said system model, information on representing components included in said system model and information on representing sub-components included in each component.

(Supplementary Note 8)

The information processing device described in any one of the supplementary notes 1 to 7, wherein said component is a hardware component and said sub-component is a software component included in the hardware component.

(Supplementary Note 9)

A data processing method, comprising determining correspondence relationship between components which are included among two system models on the basis of commonality of sub-components included in said components, and calculating similarity of said two system models on the basis of determined correspondence relationship between said components.

(Supplementary Note 10)

The data processing method, comprising determining correspondence relationship between components which are included among two system models on the basis of commonality of sub-components included in said components, calculating and outputting correspondence which is a data indicating determined correspondence relationship between the component, and calculating similarity of said system models using said correspondence.

(Supplementary Note 11)

A program recording medium which stores information processing program for executing with a computer:

a determination step for determining correspondence relationship between components which are included among two system models on the basis of commonality of sub-components included in said components; and a similarity calculation step for calculating similarity of said two system models on the basis of determined correspondence relationship between said components.

(Supplementary Note 12)

The program recording medium which stores information processing program for executing with a computer:

a determination step for determining correspondence relationship between components which are included among two system models on the basis of commonality of sub-components included in said components;

a correspondence calculation step for calculating and outputting correspondence which is a data indicating determined correspondence relationship between components; and a similarity calculation step for calculating similarity of said system models using said correspondence.

Other Exemplary Embodiment

As mentioned above, although the exemplary embodiments of the present invention is described in detail, any systems or any devices which are combination of the respective feature included in the each exemplary embodiment are also within the scope of the present invention.

And, the present invention may be applied to a system consisting of a plurality of devices and may be applied to stand alone devices. Further, the present invention can be applied to a case of which the information processing program realizing the functions of the exemplary embodiment are served to a system or to a device directly or remotely. Accordingly, a program to be installed in the computer in order to realize the functions of the present invention by a computer, a medium which stored the program and a WWW server for downloading the program are also included in the scope of the present invention.

As mentioned above, while the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-058525, filed on Mar. 15, 2010, the disclosure of which is incorporated herein in its entirety by reference.

The invention claimed is:

1. An information processing device, comprising:
   computer storage for storing information about components and subcomponents of first and second system models, each of the first and second system models having a plurality of subcomponents;
   at least one CPU programmed to operate as:
   (a) a determination unit connected to the computer storage for determining the correspondence between components of the first and second system models as a function of:
   (i) a plurality of first correspondence values, each first correspondence value indicating the similarity between a respective subcomponent of the first system model and a respective subcomponent of the second system model; and
   (ii) a plurality of second correspondence values, each second correspondence value indicating the similarity between a respective combination of subcomponents of the first system model and a respective combination of subcomponents of the second system model;
   the determination storage unit storing those of the first and second correspondence values which are greater than a predetermined threshold in a correspondence table; and
   (b) a calculation unit which generates a similarity value indicating the similarity of the first and second system models as a function of the first and second correspondence values stored in the correspondence table.

2. The information processing device described in claim 1, further comprising:
   a multiple component aggregation unit which, when at least two components included in the first system model are in correspondence relationship with at least one component included in the second system model as indicated by the stored correspondence values, generates a correspondence value indicating the correspondence between the at least two components included in the first system model on the one hand and the at least one component included in the second system model on the other hand.

3. The information processing device described in claim 1, further comprising a search unit which searches a model on the basis of similarity calculated by the calculation unit.

4. The information processing device described in claim 1, further comprising a model storage unit which correlates and stores information specifying the first system model, information on components included in the system model and information on sub-components included in each of the components of the first and second system models.

5. The information processing device described in claim 1, wherein a first of the components is a hardware component and the first component includes a software sub-component.

6. The information processing device of claim 1, wherein each of the correspondence values is calculated using an identical formula.

7. The information processing device of claim 1, wherein the calculation unit generates the similarity value using a predetermined formula.

8. A process for determining the similarity between two system models, the process being carried out by a computer system and comprising:
   storing information about components and subcomponents of first and second system models in computer storage, each of the first and second system models having a plurality of subcomponents;
   using the computer system to:
   (a) determine the correspondence between components of the first and second system models as a function of:
   a plurality of first correspondence values, each first correspondence value indicating the similarity between a respective subcomponent of the first system model and a respective subcomponent of the second system model; and
   (ii) a plurality of second correspondence values, each second correspondence value indicating the similarity between a respective combination of subcomponents of the first system model and a respective combination of subcomponents of the second system model; and
   (b) store those of the first and second correspondence values which are greater than a predetermined threshold in a correspondence table; and
   (c) generate a similarity value indicating the similarity of the first and second system models as a function of the first and second correspondence values stored in the correspondence table.

9. The process of claim 8, wherein each of the correspondence values is calculated using an identical formula.

10. The process of claim 8, wherein the similarity value is generated using a predetermined formula.

11. A non-transitory storage medium which contains software which, when run on a processor, will cause the processor to:
   store information about components and subcomponents of first and second system models, each of the first and second system models having a plurality of subcomponents;
   determine the correspondence between components of the first and second system models as a function of:
   (a) a plurality of first correspondence values, each first correspondence value indicating the similarity between a respective subcomponent of the first system model and a respective subcomponent of the second system model; and
   (b) a plurality of second correspondence values, each second correspondence value indicating the similarity between a respective combination of subcomponents of the first system model and a respective combination of subcomponents of the second system model; and store those of the first and second correspondence values which are greater than a predetermined threshold in a correspondence table; and generate a similarity value indicating the similarity of the first and second system models as a function of the first and second correspondence values stored in the correspondence table.

* * * * *